United States Patent Office 3,108,053
Patented Oct. 22, 1963

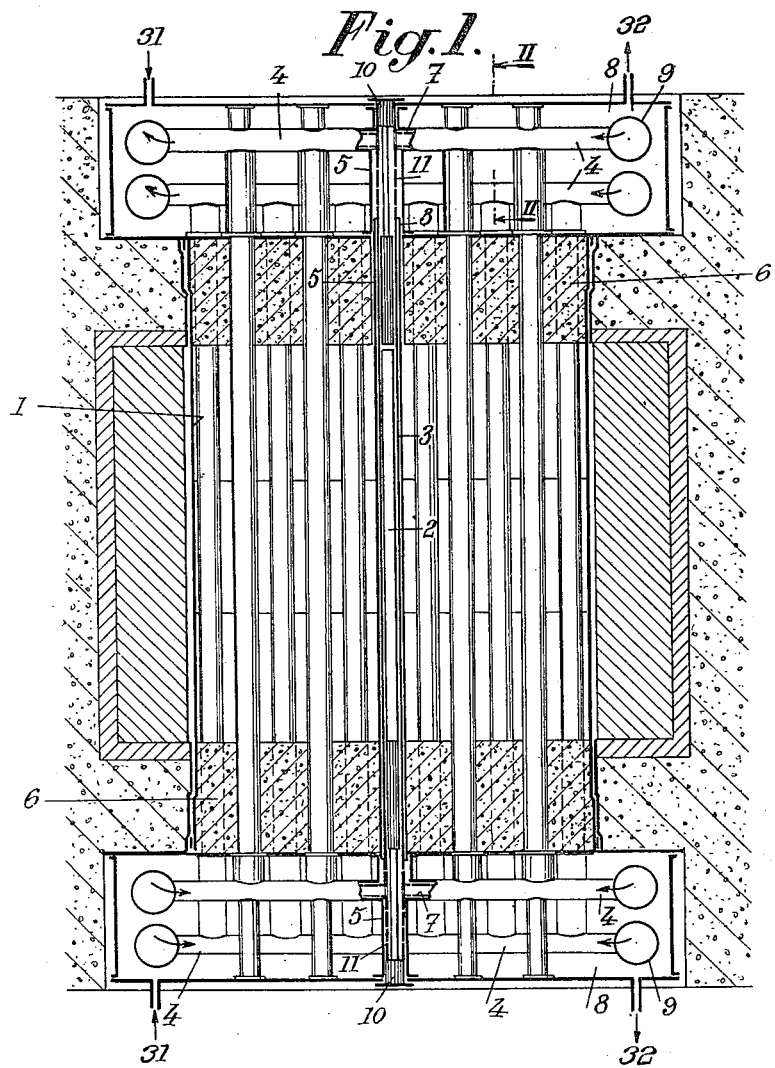
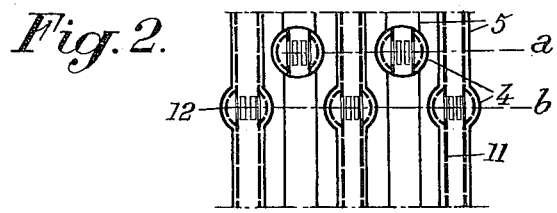

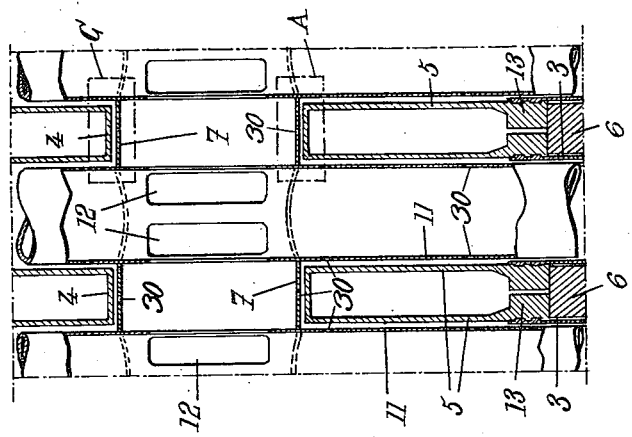
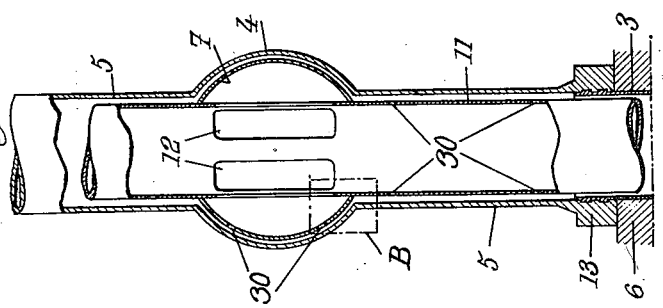

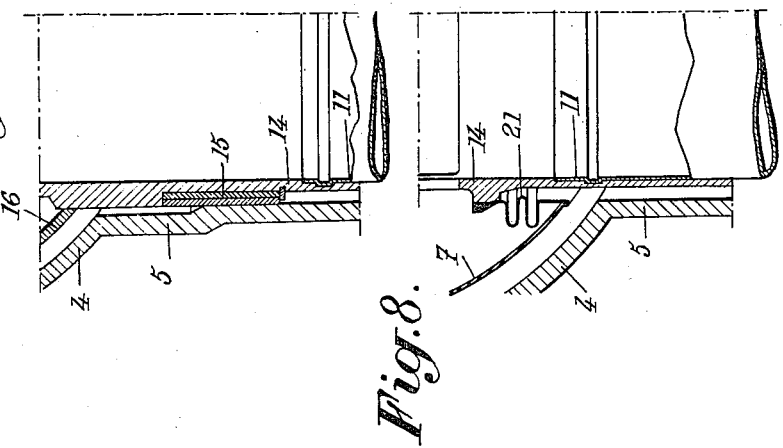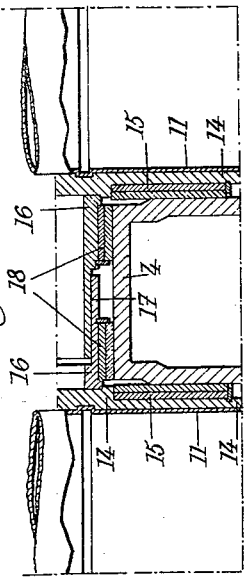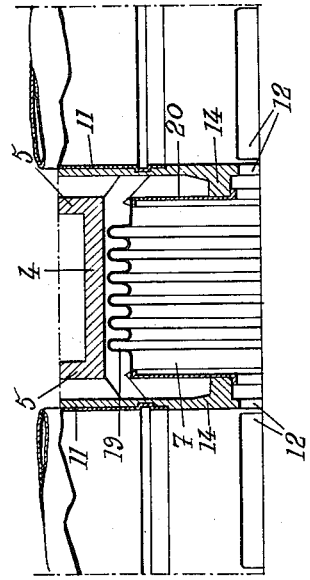

3,108,053
HEAT TRANSFER SYSTEMS FOR NUCLEAR REACTORS
Bernard Vrillon, Orsay, and Roland Roche, Clamart, France, assignors to Commissariat a l'Energie Atomique, Paris, France, an organization of France
Filed May 25, 1960, Ser. No. 31,700
Claims priority, application France June 4, 1959
2 Claims. (Cl. 204—193.2)

The present invention relates to heat transfer systems as used in nuclear reactors cooled by means of a coolant which is advantageously a gas, such systems including tubular channel elements and tubular header elements for conveying heat transfer hot gases which give rise to important thermal expansions. In the systems of this kind used at the present time, the thermal expansion made it necessary to make the tubular elements in question in the form of bellows. The construction is delicate when such tubular elements are subjected to high internal pressures.

This invention is more especially concerned with heat transfer systems for nuclear reactors utilizing as moderator heavy water kept at low temperature.

The chief object of the present invention is to provide a system of this kind in which the detrimental effects of the thermal expansion are considerably reduced.

The invention consists chiefly in arranging said systems in such manner that their tubular header elements and the portions of the heat transfer channels leading to said headers are kept at low temperature by the combined action of an internal heat insulation and of an external cooling.

Other features of the present invention will become apparent in the course of the following detailed description of some specific embodiments thereof with reference to the accompanying drawings, given merely by way of example and in which:

FIGS. 1 and 2 diagrammatically show, in horizontal sectional view and in section on the line II—II of FIG. 1, respectively, a heavy water nuclear reactor made according to the invention.

FIGS. 3 and 4 are two sectional views, at right angles to each other and on a larger scale than that of FIGS. 1 and 2, showing a system of tubular channels heads and tubular header elements belonging to the reactor, according to the invention.

FIGS. 5 and 6 show, on a still larger scale and in sectional view, some portions of said system, such as visible at A and B on FIGS. 4 and 3, respectively.

FIG. 7 shows, also on a larger scale, according to a modification, some portions such as visible at C on FIG. 4.

FIG. 8 is a sectional view analogous to that of FIG. 6 but relating to a modification.

The nuclear reactor shown by the drawings includes a tank 1 containing a moderator such as heavy water in which are located fuel rods 2 disposed in tubular channel elements 3 which may be either vertical or horizontal (the drawings showing the case where these channels are horizontal). A heat transfer gas under pressure flows through said tubular channels. Said channels lead to tubular header elements such as 4 one of which serves to introduce the gas into the system of channels and the other of which serves to evacuate said gas from said system toward heat exchangers.

It is known that in the case (which is more especially considered in the present description) where the moderator is kept at low temperature, the construction of such a system of tubular elements involves difficulties due to the fact that the heads 5 of the tubular channel elements are fixed to a block 6 at relatively low temperature, which tends to prevent free expansion of the channel elements and of the header elements, kept at a high temperature by the heat transfer gas, for instance at a temperature from 300 to 500° C.

If, for instance, a row of tubular channel elements 3 leads to a common header element 4, it is necessary, in the constructions existing at the present time, to make said header element 4 in the form of bellows, which is both difficult and expensive since said element must be capable of withstanding a high pressure.

In order to avoid this drawback, according to the present invention, the whole of the external portions of the tubular headers and of the tubular channel heads is kept at a moderate temperature, without it being necessary to make said tubular headers and channel heads in the form of bellows.

Advantageously, according to this invention, said result is obtained by providing on the one hand, on the inside of said tubular elements, a suitable heat insulation, and on the other hand, on the outside of said tubular elements, suitable cooling means capable of evacuating the heat that has been able to pass through the heat insulation means.

The internal heat insulation may be obtained in the form of a layer of insulating gas interposed between every tubular element and an internal sheath concentric thereto, so as to form a jacket (as visible diagrammatically in FIG. 1 at 7 for a header element and at 11 for a channel head element). Said insulating gas layer remains practically stationary and is kept at the same pressure as the heat transfer gas flowing inside said sheath, so that the latter, being subjected to practically the same pressure on opposite sides thereof, can be made very thin and be constructed and mounted easily.

Of course, this internal jacketing, which is generally subjected to high temperature, must be arranged in such manner as to permit expansion with respect to the external tubular elements which remain at a relatively low temperature. For this purpose, the jacketing may be made of several elements sliding with respect to one another, or it may include bellows which are of easy construction since the sheaths are of small thickness.

Such heat insulation means might be completed, if the jackets are metallic, by at least one lining of a thermal insulator, the substance of this insulator being anyway chosen so that it is little absorbent of neutrons. Thus, if a small amount of this insulator is driven into the core of the reactor, there is no reduction of the reactivity thereof.

As for the external cooling means, they may be constituted by a circulation of air or gas along the system formed by channel heads 5 and header tubular elements 4, which may be provided with cooling fins. However, it seems preferable, as shown by the drawings, to make use of a liquid circulation, for instance of the cooling water circulation, taking place at a relatively low rate in tanks 8 which contain the header elements and the channel head elements. This liquid enters at 31 and flows out at 32.

In the arrangement diagrammatically shown by FIG. 1, the heat transfer gas arrives through one of the header elements and is evacuated through the other.

The tubular channel elements 3 with their fuel rods 2 are disposed in several rows, in the usual manner, and the channels of a given row are connected at their ends to two header elements 4 placed in the two cooling tanks. It will be seen that, in said tanks, the header elements are disposed along two lines $a$ and $b$, and in staggered fashion, two successive rows of channel elements 3 leading to two pairs of header elements belonging to said two lines $a$ and $b$, respectively. The ends of the header elements 4 lead to other tubular elements 9 of greater cross-section.

If the whole is suitably calculated, it is possible to obtain for instance that, the cooling water in tanks 3 being at 50° C., the walls of the header elements 4 are only at a temperature of 50°+x (this value x being of the order of 20° C. or little more), instead of being at the temperature of the heat transfer gas (from 300 to 500° C.).

With such an arrangement, the header elements 4 may be made in the form of rigid rectilinear tubes, which considerably simplifies the construction of the reactor.

We will now describe, by way of example and with reference to FIGS. 3 to 8, some details of construction of the inner jacketing which permit of obtaining a heat insulation on the inside of header elements 4 and channel head elements 5.

FIGS. 3 and 4 show, on an enlarged scale and diagrammatically, the mounting of several channel head elements 5 belonging to the same row, on a header element 4 through which pass several of said channel head elements (the end of each of said head elements being closed by a plug such as 10, FIG. 1).

The jacketing means of header elements 4 is shown diagrammatically at 7, and the jacketing means of the channel head elements, designated by reference numeral 11, passes through said jacketing 7, with the provision of ports 12 to permit the passage of the heat transfer gas from the header elements, or inversely.

The annular intervals left between jacketing means 7 and 11 on the one hand, and tubes 4 and 5 on the other hand, are filled with a gas which remains stationary. The pressure is balanced on opposite sides of jacketing means 7 and 11 owing to the provision of small passages 30 provided in the jacketing means and which do not permit a substantial rate of flow therethrough.

At their ends adjacent to tubular block 6, channel head elements 5, which extend in line with tubular channel elements 3, include a flange 13 for fixation of said channel heads 5 to said block 6. Jacketing means 7 and 11 consist of relatively thin sheaths, whereas the channel head elements 5 and the header elements 4 are made of strong tubes of suitable cross-section.

FIG. 5, which corresponds for instance to the portion shown at A on FIG. 4 but on an enlarged scale and with greater details, illustrates how the internal jacketing means are made in the portion where header elements 4 and channel head elements 5 are branched together.

The sheath extending along the axis of the channel head element carries at this place tubular pieces 14 centered in said channel head element by rings 15 of small length, made of a material which is refractory and a bad conductor of heat (for instance asbestos or alumina). On the free ends of said pices 14 are fixed thin sheaths 11 which constitute the jacketing outside of the branching zone. These tubular pieces 14 are provided with the above mentioned ports 12. They are also visible on FIG. 6 which shows the detail of the portion B of FIG. 3.

According to the embodiment of FIGS. 5 and 6, the jacketing extending along the axis of header element 4, that is to say the sheath diagrammatically illustrated at 7 on FIGS. 1 and 3, is constituted, at the place where a channel head element is branched to the header element, by tube portions 16 through which pass the thermal insulation tubes of the channel head elements, that is to say the tubes 14 above referred to. The adjacent portions of tubes 16 fit together by means of a sliding assembly 17, so as to permit thermal expansion, and they are centered in header element 4 by insulating rings 18 analogous to rings 15.

A modification is illustrated by FIGS. 7 and 8, FIG. 7 corresponding for instance to the portion shown at C on FIG. 4, whereas FIG. 8 corresponds substantially to FIG. 6.

In this modification, the thermal insulation of every header element 4 is constituted by a thin sheath, such as designated at 7 on FIG. 3, except between the channel head elements where it consists of a bellows 19 which permits free expansion of said thin sheath and its centering in header element 4.

Thermal insulation of the channel head elements in the branching zone is then ensured by tubes 14 of the same kind as those of FIGS. 5 and 6, but centered by means of tubular abutments such as 20, 21, tubular abutment 21 being in the form of a bellows.

The system according to the present invention has many advantages and in particular the following ones:

It is possible to fix the tubular channel elements on a rigid assembly which is kept at a low temperature;

It is therefore also possible to make use of rigid rectilinear header tubes which are easy to manufacture;

The system works under excellent conditions and therefore ensures distribution of a heat transfer fluid at high temperature and under high pressure;

The thermal expansions are negligible, so that the geometry of the system does not change, the interval between the channel elements remaining the same from one end to the other of the reactor;

Bellows or other resilient elements are eliminated in all tubular parts subjected to a relatively high pressure.

Of course, the system according to this invention might be applied to reactors of a type different from that illustrated by the drawings.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

What we claim is:

1. In a nuclear reactor including a row of tubular channels for the circulation of a heat transfer fluid, the combination with said tubular channels of a header tubular element extending transversely to said row and in the plane thereof, tubular channel heads in line with said channels and rigidly mounted both on said channels and on said header element to form connections between said channels respectively and said header element, a tank surrounding said rigid assembly and filled with a circulating cooling fluid, and thin tubular sheaths mounted coaxially in said tubular channel heads and said header tubular element to limit along the inner walls thereof spaces containing an intermediate gas jacket forming a heat insulation between said rigid assembly and the space inside said sheaths where the heat transfer fluid is circulating.

2. A combination according to claim 1 in which said tubular sheaths are provided with small holes extending therethrough, to balance the pressures on opposite sides of said sheaths respectively.

References Cited in the file of this patent
FOREIGN PATENTS
286,658 Switzerland _____ Mar. 3, 1958